(12) United States Patent
Kubitsky et al.

(10) Patent No.: US 6,279,821 B1
(45) Date of Patent: Aug. 28, 2001

(54) PRINTABLE BLANK FOR FORMING VIDEO CASSETTE BOXES

(75) Inventors: Matthew F. Kubitsky, Guilford, CT (US); Peter H. Tracy, Key West, FL (US)

(73) Assignee: Neato, LLC, East Haven, CT (US)

( * ) Notice: Subject to any disclaimer, the term of this patent is extended or adjusted under 35 U.S.C. 154(b) by 0 days.

(21) Appl. No.: 09/193,329

(22) Filed: Nov. 16, 1998

(51) Int. Cl.⁷ .................................................. B65D 5/08
(52) U.S. Cl. ........................................ 229/193; 206/387.1
(58) Field of Search ........................... 493/55; 206/387.1; 229/193, 933–937

(56) References Cited

U.S. PATENT DOCUMENTS

| | | | |
|---|---|---|---|
| 1,591,427 | * 7/1926 | Leary | 229/193 |
| 3,073,217 | * 1/1963 | Spalding et al. | 493/55 |
| 4,445,634 | * 5/1984 | Sato | 206/387 |
| 4,682,974 | * 7/1987 | Sun | 493/55 |
| 4,688,673 | * 8/1987 | Yabe | 206/387 |
| 5,172,988 | * 12/1992 | Ledley et al. | 400/83 |
| 5,419,011 | * 5/1995 | Finke et al. | 206/387.1 |
| 5,560,484 | * 10/1996 | Tomisawa et al. | 206/387.1 |

* cited by examiner

*Primary Examiner*—Stephen P. Garbe
(74) *Attorney, Agent, or Firm*—Allen D. Brufsky

(57) ABSTRACT

A blank having a defined pattern of reduced strength, allowing separation along said defined pattern, the pattern defining a box for a video cassette comprising a single sheet having a first and second printable portion having side flaps and tabs which can be folded into a rectangular parallelpiped shape.

11 Claims, 5 Drawing Sheets

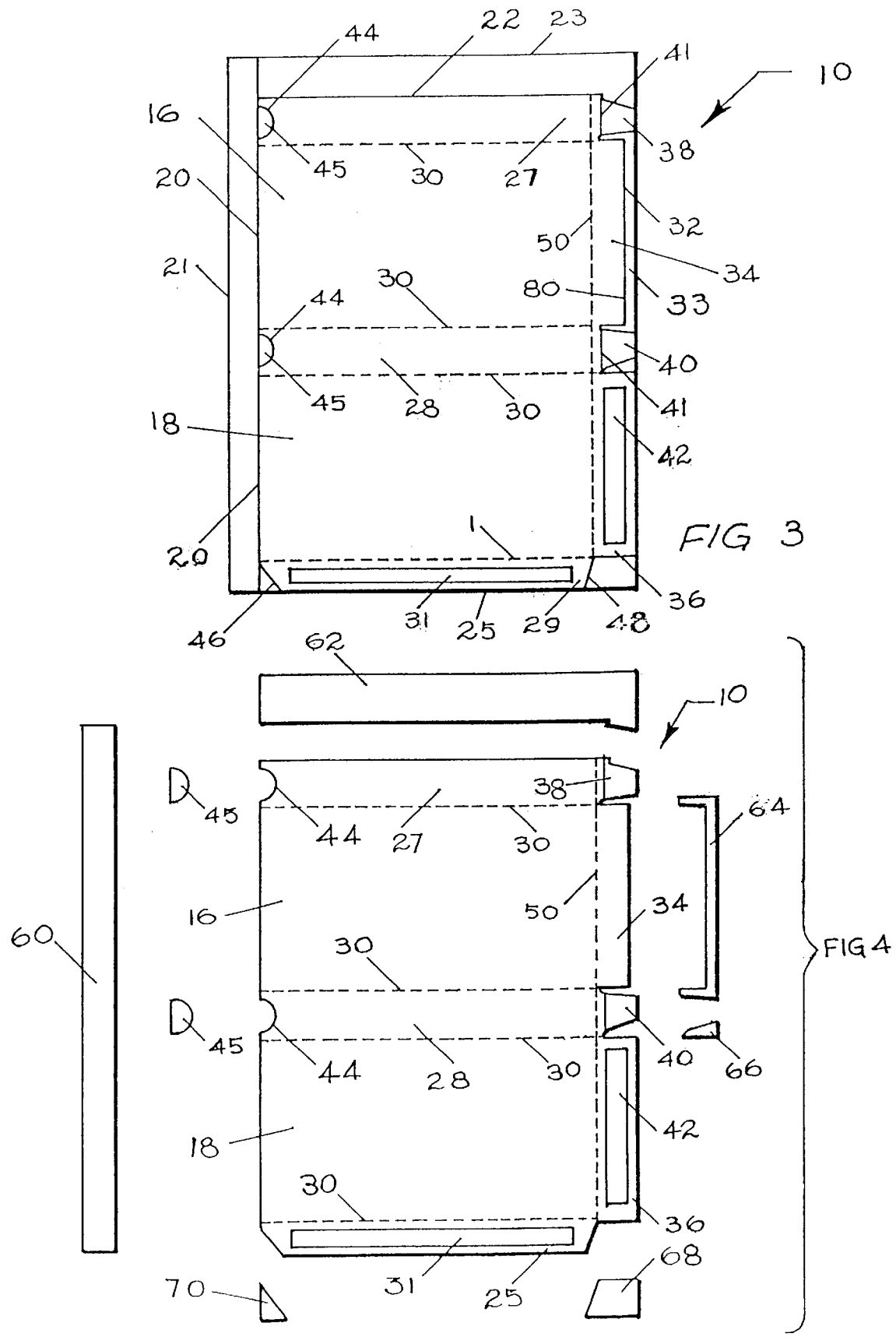

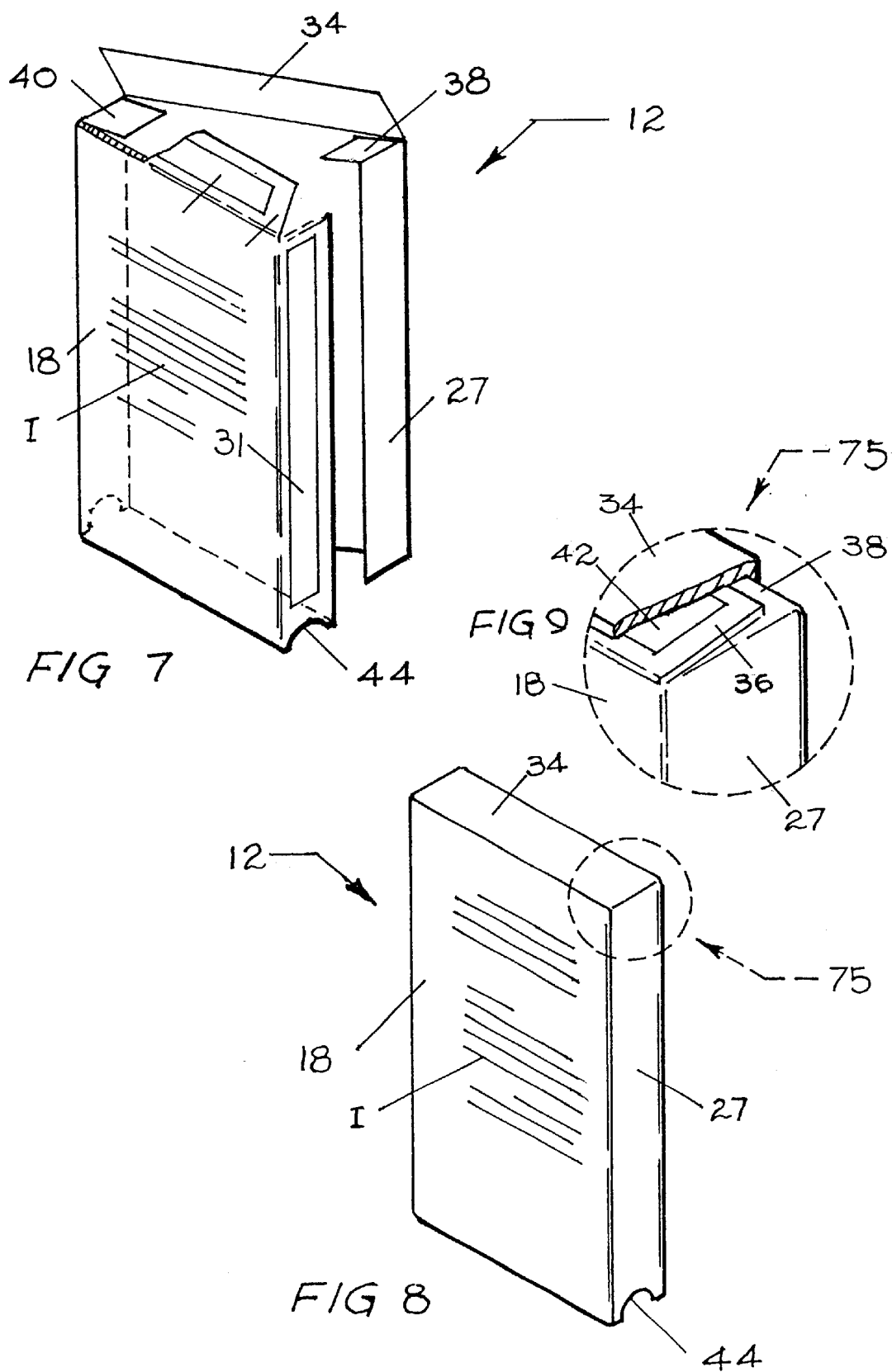

PRINTABLE BLANK FOR FORMING VIDEO CASSETTE BOXES

BACKGROUND OF THE INVENTION

1. Field of Invention

This invention relates to a computer printable blank for forming a video cassette box for housing and identifying home videos and the like.

2. Description of the Prior Art

Video cassette's containing movies or instructional media have been provided and stored in a rigid plastic material case, the case having a hinged lid enabling one to gain access to the cassette. This was satisfactory when the video cassette was provided in a read only form from a manufacturer or distributor such as a video rental store. Nowadays such cassettes are provided in a read and write form or in blank for copying of video TV programs or making home videos of various events. Users therefore, need to be able to identify the contents of such video cassettes and if necessary to vary the list of contents when changes are made on the cassette.

Computer programs can be written to enable a list of or the nature of the material on a video cassette to be identified which may be placed on the cassette container to identify its contents. But, the rigid performed container cannot be passed through a conventional computer printer.

To avoid this and according to the invention the contents of the video cassette is printed out on a flat substrate such as a piece of paper or a blank which can then be folded, and with adhesive joined to form a container box to hold the cassette, with the printed list of contents appearing on one or both flat faces of the container or box. Further, the blank can be dimensioned to fit all size computer printers by trimming its edges before use or by trimming them after printing to take advantage of a "bleed" of ink across of the trim boundary, as so that the finished graphic design on the box will transcend the edges to appear professional and finished.

SUMMARY OF THE INVENTION

Therefore, according to the invention there is provided a flat sheet capable of being passed through a printer to be provided with printed matter, the sheet being marked so that it can be folded and parts of the sheet separated if necessary to fit in the printer or to remove unprinted portions in the finished printed product. When folded the sheet or blank, provides substantially flat front and rear faces for the cassette box joined to one another along fold lines and a closure at one end of the resulting box, the printing being intended to be on one or both of the faces. Side flaps extend from either side of the front or rear face and are joined to the respective face along a fold line. Tab regions on the top of the front and rear faces can be pushed out of line with the respective face and are positioned to overlie and be adhesively connected to each other and receive and trap the top edge/portions of the side flaps after they have been folded, thereby holding the box together. One face of a tab region can be provided with adhesive to connect to an the overlying tab.

When such a sheet is folded and assembled it forms a rectangular parallel piped having an open top left between the two parallel faces at the ends of those faces which are not joined to one another by the overlying tabs; enabling insertion or removal of a video cassette between the faces. Finger cut-outs may be provided on the top of the side flaps for spreading the faces for easy insertion and removable of the video cassette.

It is desirable that the piece of paper or blank be of a conventional size to fit in the printer, for example, nine inches perforated lines are provided to trim the size of the blank, if necessary, up to the edge of the printer so that the blank can be printed in a smaller printer e.g., portable computer printers.

Alternatively, since a standard computer printer will usually print to within ¼ inch of the edge of the blank or an 8½ inch letter-size width, it is desirable to have the printed media and ink "bleed" over the trim perforation to within ¼ inch of the opposite side edge; the trim can then be removed, and the resultant print indicia will appear up to the edge of the blank, resulting in a professional graphic design, if such is provided by the computer software.

By contrast the size of the interior of the assembled box should be such that the cassette fits reasonably tight in the assembled box. Therefore in a preferred embodiment the overall shape of the portions of the blank which are to make the box are delineated within the overall blank and surrounding portions are discarded after printing in a conventional printer and before the assembly of the box. If a smaller size portable printer is used, the blank is first trimmed, as indicated. In either case, there is a modest degree of waste.

The delineation of the sheet or blank material which is to be used as the box can be achieved by printing appropriate lines and then cutting away the excess material. Preferably however the delineation is achieved by partial severing of the sheet so that after printing a user can quickly remove the excess sheet or blank material. This can readily be achieved by a stamping of the sheet with cut lines or perforations which do not completely sever the parts of the sheet so that the sheet remains in one piece during normal heading and passage through the printer, but can be separated easily by tearing when required.

It is also preferable that the various fold lines between the two faces and the flaps be marked and conveniently this can be achieved by scoring which allows for simple and accurate folding.

BRIEF DESCRIPTION OF THE DRAWINGS

The invention will now described, by way of example, with reference to the accompanying drawings, in which:

FIG. 3 shows a sheet or blank according to the invention for forming the box;

FIG. 4 shows the blank of FIG. 3 with portions trimmed before or after printing;

FIGS. 7 and 8 illustrate the steps of folding the printed blank of FIGS. 3 and/or 4 into a box; and FIG. 9 is a perspective detailed view of the corner of the circled portion of the folded blank of FIG. 8.

DETAILED DESCRIPTION OF THE PREFERRED EMODIMENT

Figure 1:
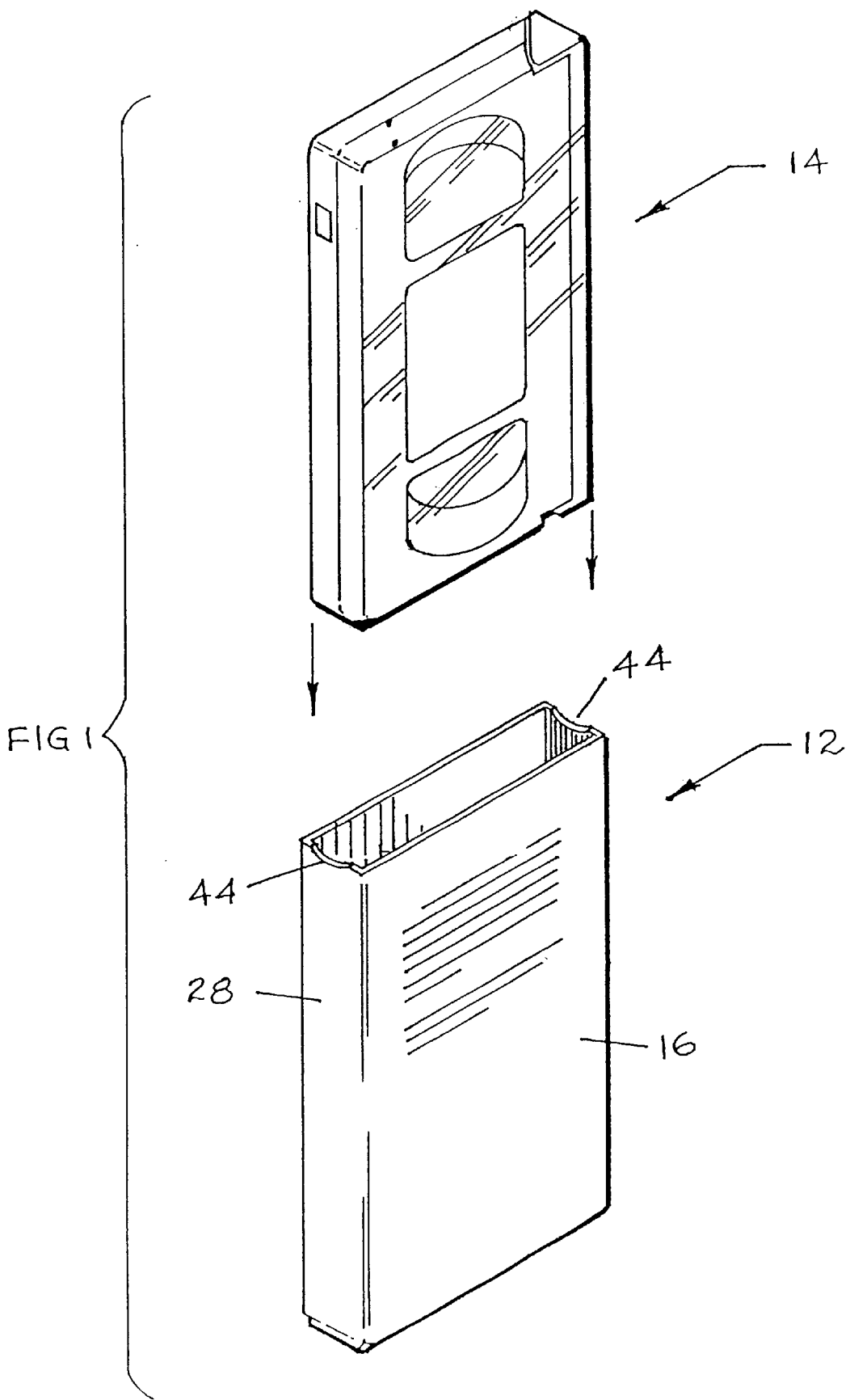
FIG. 1 is an exploded perspective view of a video cassette and video cassette box for housing the cassette, formed from the blank of the present invention.
Figure 5:
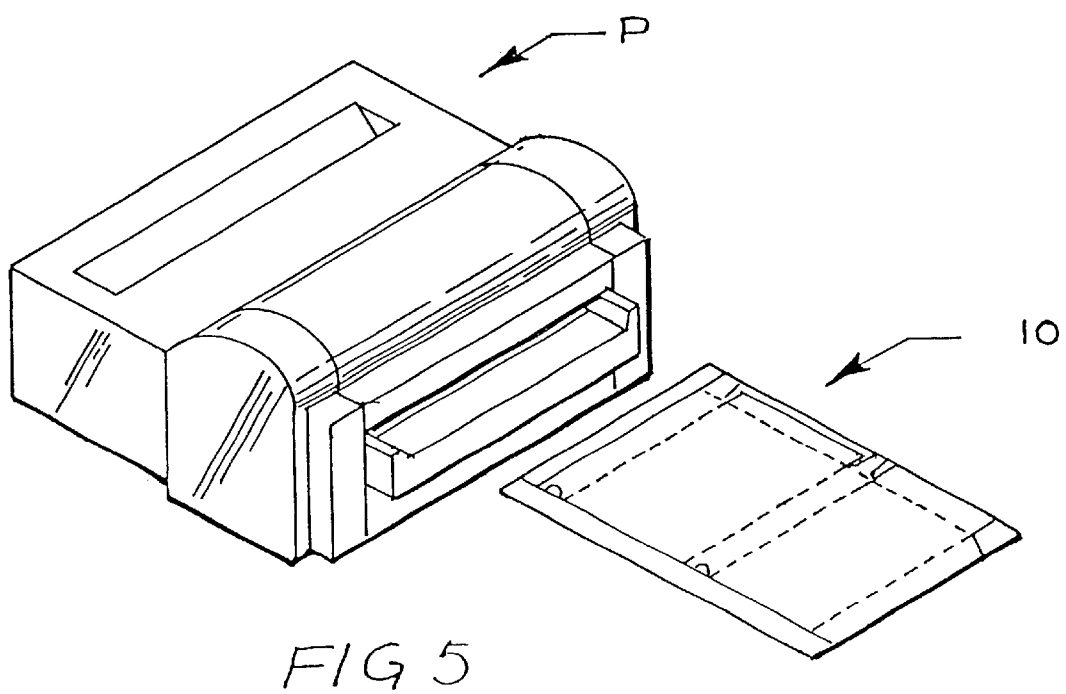

The sheet or blank 10 shown in FIG. 3 is desirably of thin or light paperstock and approximately 9 inches in width, slightly larger than a standard letter size or A4 sheet but of a width to fit in a computer printer P, as shown in FIG. 5. It is provided with a number of partially cut or perforation lines as described below which keep the sheet or blank in one piece for standard printing on a computer but from which edge portions can readily be separated or torn to leave a major portion to be formed into the box 12 shown in FIGS. 1 and 2.

Printing can be provided in either or both of the areas 16 and 18 by passing the sheet 10 through a computer printer P, as shown in FIG. 5. A suitable program can be provided to list the contents of a video cassette 14 and print that list of indicia I in one or both of the areas 16 and 18 with pictorial or design matter encompassed by indicia I in the correct orientation or position to be readable in the finished cassette box 12.

Figure 6:
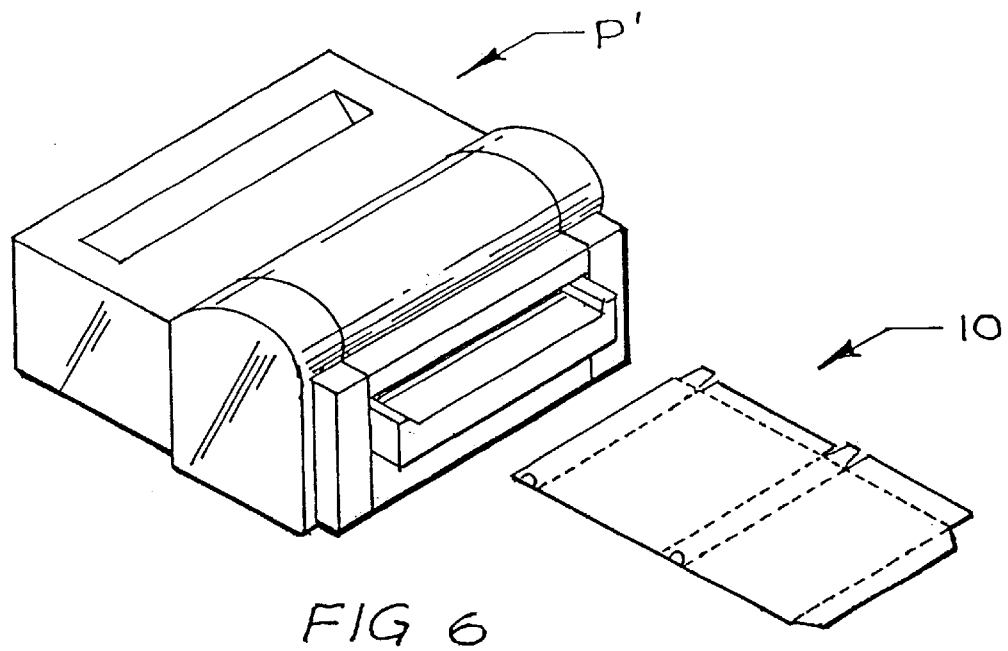
FIGS. 5 and 6 are perspective views of a computer printer for receiving the blank of FIGS. 3 and 4, respectively.

A pair of cut lines 20 and 22 are provided near one side edge 21, and a top edge 23 of the sheet or blank 10 for trimming the blank after printing or "bleeding" over the edges 20 and 22 by the computer printer P. Normally the printer P will print indicia to within ¼ inch of edges 21, 23, 25 and 33 and upon removal of the "trim" defined by cut lines 20, 22 and 32 (adjacent side edge 33) the entire surface of blank 10 will appear to be printed. Alternatively the blank can be trimmed before printing as shown in FIG. 6, if the printer is smaller than standard such as with a portable printer P. Printing will be short of the cut edges, by a ¼ an inch, but can be blended into the indicia, e.g., by use of indicia within the edge border.

The cut lines define a rear face 16 and a front face 18 with side flaps 27, 28 integral with the front face 16 and side flaps 28, 29 integral with the rear face 18. These sides flaps are defined by scorelines 30. The flap 29 is provided with an adhesive strip 31 until printing of the blank 10 has occurred.

Figure 2:
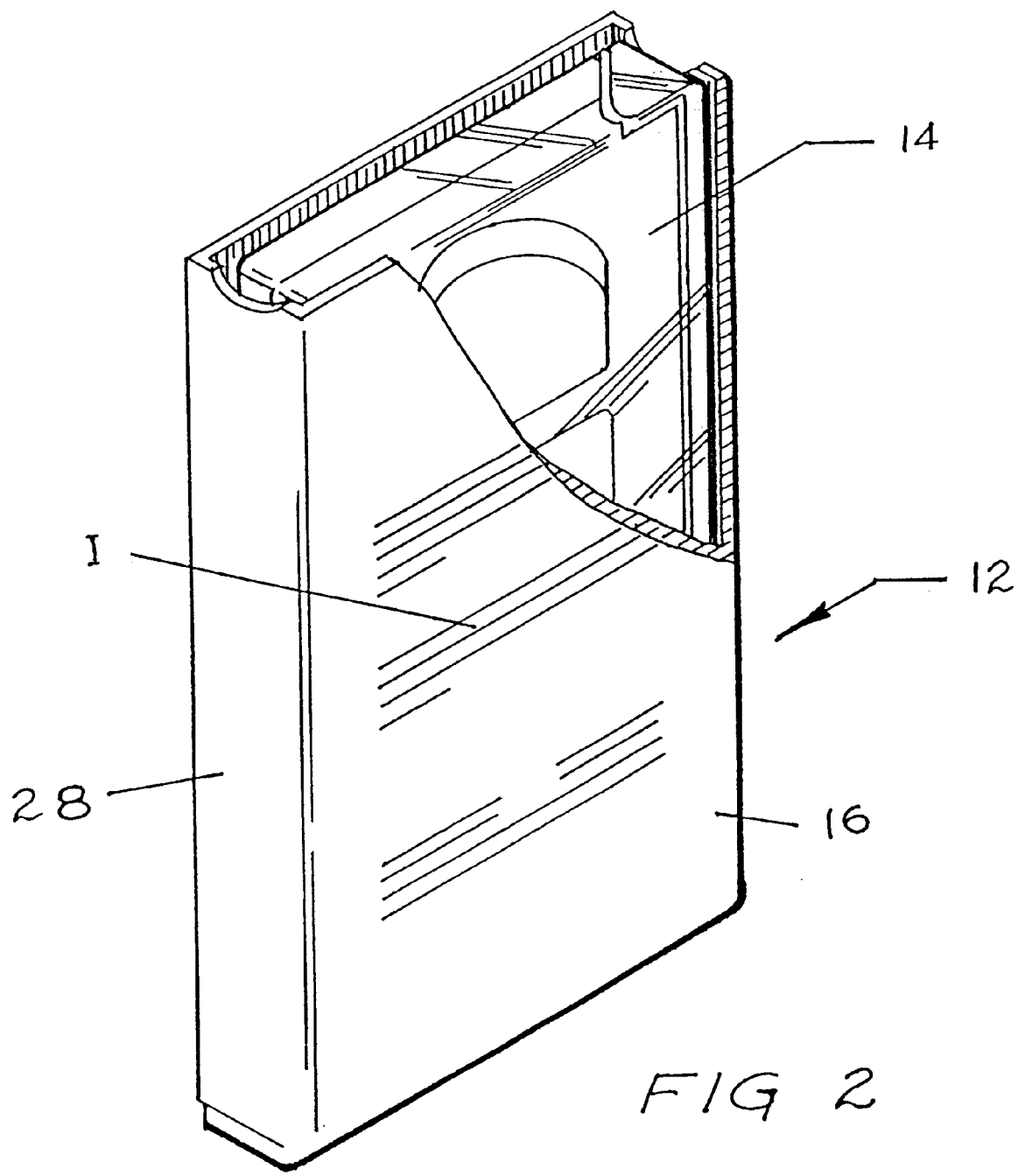
FIG. 2 is a perspective view, partially cut away of the housed cassette in the box of FIG. 1.

At the side edge 33 of the sheet 10 an irregular cut line 32 is provided to define inter alia the top tab 34, of the face 16, top tab 36 of the face 18, and tabs 38, 40 connected by a scoreline 41 to the top of side flaps 27, 28 respectively. Tab 36 includes an adhesive area 42 covered by an adhesive strip until the blank 10 is printed. At the bottom of side flaps 27, 28 semi circular cuts 44 are provided to define thumb or finger grips to spread the distance between the flaps 27, 28 to facilitate insertion of a cassette within the assembled box 12 as shown in FIG. 2. Similarly, inclined cut lines 46, 48 are provided at the opposed ends of flaps 29 to facilitate assembly of blank or sheet 10 into box 12, by enabling the tabs 38, 40 to be folded about scorelines 41 without interference and the blank material between cut lines 20 and side edge 21 to be readily removable from the sheet or blank 10.

After printing indicia or graphic I (on a standard printer or in the event of a smaller computer printer P' before printing), the user tears the stock along the lines 20, 21, 32, 44, 46, 48 so removing the surplus edge portions of the sheet or blank 10, designated by numerals 60, 62, 64, 66, 68, 70 and 45 in FIG. 4. Then the user can fold the blank 10 along lines 30 and 50 (connecting the tabs 38, 34, 40 and 36 to the top of the respective side flaps and faces) as indicated in FIGS. 7 and 8 to form the basic box shape, followed by bending or folding over the tabs 38, 40 about fold line 41 to complete the box as shown in FIG. 9. The edges of these tabs 38, 40 are inserted under the tabs 34, 36 which trap the tabs 38, 40 in place to form the final box 12. Tab 36, after removal of adhesive strip from adhesive area 42, is placed beneath tab 34 and secured thereto. Similarly, the adhesive strip is removed from adhesive area 31 and flap 29 placed beneath flap 27 and secured thereto.

As can be seen the arrangement is quick, simple and avoids problems during printing.

What is claimed is:

1. A printable blank having a defined pattern of reduced strength, allowing separation along said defined pattern, said pattern defining a box for a video cassette comprising a single sheet having a first and second face portion adapted to have print material placed thereon by a printer connected to a computer generated program and having side flaps adapted to be folded and overlapped and secured together to form a rectangular parallelepiped, and a tab portion of said first and second face portions adapted to be folded and overlapped and secured together to form bottom tabs connected to an edge of said first and second face portions.

2. The blank according to claim 1, wherein said sheet is formed of paper.

3. The blank according to claim 1, wherein said pattern is formed by perforation of said sheet.

4. The blank according to claim 1, wherein said sheet further comprises a pair of score lines, each of said pair of score lines defining a folding axis for said side flaps.

5. The blank according to claim 1, wherein the sheet from which said pattern is cut is slightly larger than letter size dimensions.

6. The blank according to claim 1, wherein the sheet from which said pattern is cut is slightly larger than A4 size dimensions.

7. The blank according to claim 1, wherein said sheet includes cut lines defining arcuate spaced slots along an edge of said defined pattern.

8. The blank according to claim 1, wherein said first and second portions are separated by a pair of parallel score lines defining one of said side flaps.

9. The sheet according to claim 1, wherein said first face portion and said second face portion each have a juxtaposed edge providing a perforated separation between said edge and said first and second portions.

10. The sheet according to claim 1, wherein a medium forming the sheet is adapted to be printed using an ink.

11. The blank according to claim 1, wherein said sheet further comprises a score line defining a folding axis for said tabs.

* * * * *